No. 659,064. Patented Oct. 2, 1900.
G. W. HINCHMAN.
DROP LIGHT GAS FIXTURE.
(Application filed Mar. 13, 1900.)
(No Model.)
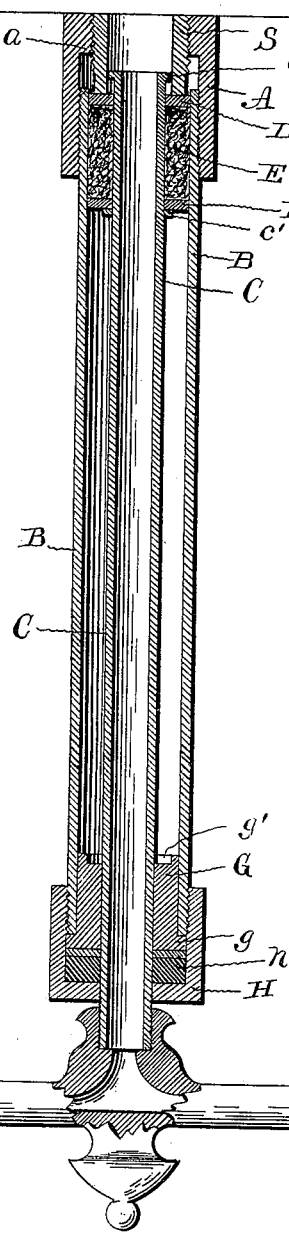
Witnesses
George W. Hinchman,
Inventor,
By John B. Thomas & Co.,
Attorneys

UNITED STATES PATENT OFFICE.

GEORGE W. HINCHMAN, OF GLENWOOD, INDIANA.

DROP-LIGHT GAS-FIXTURE.

SPECIFICATION forming part of Letters Patent No. 659,064, dated October 2, 1900.

Application filed March 13, 1900. Serial No. 8,471. (No model.)

*To all whom it may concern:*

Be it known that I, GEORGE W. HINCHMAN, a citizen of the United States, and a resident of Glenwood, in the county of Rush and State of Indiana, have invented an Improved Drop-Light Gas-Fixture, of which the following is a specification.

The object of this invention is to provide a drop-light gas-fixture which can be conveniently raised and lowered and in which the joints are so formed that an escape of gas is positively prevented, while the construction and arrangement of parts is such that small-sized tubes or pipes are employed, which will give a neat appearance to the chandelier.

In the following specification I have entered into a detail description of the invention, reference being had to the accompanying drawing and to letters thereon, which designate the different parts, and what I consider to be new in the particular construction and combination of parts is more specifically set forth in the appended claims.

In the drawing the figure is a vertical sectional view of a drop-light gas fixture or chandelier constructed in accordance with my invention, the movable part being raised.

In carrying out my invention a coupling A is screwed to the service-pipe S, which projects through the ceiling, and into the lower end of said coupling is screwed the outer tubing B of the chandelier or gas-fixture. The upper end of the coupling is provided with an inwardly-projecting threaded flange $a$, which engages the threads on the lower end of the service-pipe, the latter projecting into the coupling, as shown and for the purpose set forth.

Within the tube B is a tube C, which is of such size relative to the said outer tube as to leave a space between them, and this inner tube carries at its lower end the arms C', to which the gas-burners are attached. The inner tube is adapted to slide within the outer tube for the purpose of raising and lowering the gas-burners, and in order to provide tight joints and prevent the escape of gas I have devised improved packings for the ends of the tubings.

The upper end of the inner tube C is provided with an external flange $c$, which limits the upward movement of a washer D, fitting between the inner and outer tubes, and below said washer is a loose packing E, resting upon a washer F, the latter being supported normally by a flange $c'$ on the inner tube. This packing and the washers at the ends thereof serve to prevent the gas from escaping into the space between the tubes of the chandelier, and to increase the effectiveness of said packing it is compressed in the manner hereinafter set forth. The expansible or loose packing also provides for an escape of the gas confined between the inner and outer tubes, and thereby insures an easy movement of the slidable part.

At the lower end of the outer tube is a bushing G, through which the inner tube C passes, said bushing having a flanged head $g$, which overlaps the end of the outer tube, and the inner end of the opening through this bushing is countersunk, forming a ring $g'$. The bushing is retained in place by a cap H, having a central opening through which the inner tube passes, and within said cap is a packing $h$, forming a gas-tight joint. The cap is screwed upon the outer tube B and compresses the packing $h$ against the inner tube, the friction at this point, in connection with the friction of the packing E between the inner and outer tubes, being sufficient to support the extensible part of the chandelier at any desired elevation. When the chandelier is lowered to its fullest extent, the bushing G will contact with the washer F and raising said washer will compress the loose packing E between the washers F and D to more effectually prevent the escape of gas, and, conversely, when the extensible part is elevated to its fullest extent the lower end of service-pipe S will contact with washer D and forcing it downward will compress the packing E.

In providing a drop-light gas fixture or chandelier difficulty has been experienced in preventing the escape of gas past the packings, owing to the considerable pressure of the gas. The construction herein shown and described is therefore designed to overcome this objection in the simplest possible manner, and it will be noted that the great amount of friction required to support the extensible part of the chandelier is provided by the packing $h$ and is regulated by screwing the cap H. The principal wear, therefore, is upon this packing, which can be readily and conveniently renewed by simply unscrewing the cap from the outer tubing, and during this operation there will be no escape of gas, as the tube C can be lowered to its fullest extent and will compress packing E to form a tight joint.

Having thus described my invention, what I claim as new, and desire to secure by Letters Patent, is—

1. A drop-light chandelier, comprising a stationary outer tube B, a tube C slidable within said stationary tube, flanges c and c' on said inner tube, a bushing G in the lower end of the stationary tube and through which the inner tube passes, an expansible or loose packing E around the upper end of the inner tube between the flanges c and c', and a depending pipe S at the upper end of the fixture with which the upper end of said expansible or loose packing engages when the tube is at its upper position, and by which said packing is compressed, substantially as shown and for the purpose set forth.

2. A drop-light chandelier, comprising the stationary tube B, a tube C slidable therein and carrying the burners, flanges c and c' on the upper end of the inner tube, loose washers F and D and interposed loose packing E on the upper end of said inner tube between the flanges c and c' thereof; together with the depending pipe S adapted to receive the upper flanged end of the tube C and move the washer D, a bushing G in the lower end of the stationary tube and having a flange g' adapted to engage and move the washer F, and a cap H screwed upon the lower end of the stationary tube, the parts being constructed and arranged as herein shown and described.

GEORGE W. HINCHMAN.

Witnesses:
ALLEN HINCHMAN,
FRANCES MEEK.